UNITED STATES PATENT OFFICE.

LIVINGSTON GIFFORD, OF JERSEY CITY, NEW JERSEY, ADMINISTRATOR OF KARL HEUMANN, DECEASED, ASSIGNOR TO THE BADISCHE ANILIN AND SODA FABRIK, OF LUDWIGSHAFEN, GERMANY.

BLUE DYE AND PROCESS OF MAKING SAME.

SPECIFICATION forming part of Letters Patent No. 617,651, dated January 10, 1899.

Application filed December 17, 1897. Serial No. 662,304. (Specimens.)

*To all whom it may concern:*

Be it known that KARL HEUMANN, deceased, late of Zurich, Switzerland, did invent the New Dyestuff Allied to Indigo, of which the following is a specification, and for which patents have been obtained in the following countries: England, No. 8,726, dated June 5, 1890; France, No. 206,567, dated June 23, 1890; Belgium, No. 91,156, dated July 15, 1890; Germany, No. 58,276, dated August 15, 1890; Spain, No. 11,005, dated August 21, 1890; Italy, XXIV, 27,841, LIV, 453, dated September 30, 1890, and Austria, No. 40/3,802, dated December 12, 1890.

In previous applications for Letters Patent the preparation of blue coloring-matter from phenyl-glycocol, from phenyl-glycocol carboxylic acid, and of a new dyestuff resembling indigo in many respects from tolyl-glycocol, all by the action of caustic soda or some equivalent under suitable conditions on these bodies have been described.

This invention involves the discovery that either ordinary indigo or a new dyestuff allied to indigo, or mixtures of ordinary indigo with the said new dyestuff, can be obtained by treating ethyl-phenyl-glycocol with a caustic alkali or its equivalent and subsequently oxidizing the product. The nature of the ultimate product depends upon the conditions observed when treating the said ethyl-phenyl-glycocol with the caustic-alkali or equivalent, as aforesaid. Thus if the ethyl-phenyl-glycocol be melted with the alkali at a temperature of about 270° centigrade for a suitable length of time a product consisting of ordinary indigo can be obtained; but if the operation be carried on at a higher temperature and in the manner substantially as hereinafter described a product consisting, mainly or entirely, of a new dyestuff allied to indigo is obtained. The conditions of operating, which result in the formation of a product consisting, mainly or entirely, of ordinary indigo and which constitute a new process for the production of indigo from ethyl-phenyl-glycocol, are not claimed in this application for Letters Patent, but form the subject-matter of a separate application filed December 17, 1897, Serial No. 662,306.

The invention for which protection is asked by this application for Letters Patent is the production of the aforementioned new dyestuff allied to indigo. This new dyestuff differs from indigo in many respects, but resembles this most valuable dyestuff with sufficient closeness to permit of its substitution for it in many ways.

The ethyl-phenyl-glycocol used in this invention results from the interaction of mono-ethyl-anilin and monochlor-acetic acid. It is preferably prepared by heating together one molecular proportion of monochlor-acetic acid and two molecular proportions of mono-ethyl-anilin at first for about three hours at a temperature of about 100° centigrade and subsequently for about four hours longer at a temperature of about 110° to 115° centigrade. The product when cold is mixed with water and treated with a slight excess of alkali. The unused monoethyl-anilin which separates out is removed from the aqueous solution, and this is then made slightly acid with acetic acid. If not too much water has been taken, a portion of the ethyl-phenyl-glycocol will separate out as an oil. The whole can be isolated by extracting with a suitable solvent, such as ether, and distilling off the solvent. The ethyl-phenyl-glycocol is thus obtained as a thick yellowish oil.

As an example of the manner in which this invention can be carried into practical effect the following directions are given for the manufacture of the new indigo compound: Mix about one part of ethyl-phenyl-glycocol (obtained as above described or in any other way) with about three parts of caustic potash and heat the mixture rather quickly to a temperature of, say, about 350° centigrade. Continue heating for some minutes or until the orange color of the melt no longer increases in intensity. Cool quickly, dissolve the melt in water, and then blow air through the solution until no more blue precipitate forms. Filter, wash with water containing a little hydrochloric acid, then with cold alcohol, and dry the residual dyestuff. The new dyestuff thus obtained in its unsulfonated form is a deep-blue powder, giving a lustrous bronze-like streak on rubbing. Like indigo, it is insoluble in water; but it differs from indigo in being more soluble in most other solvents in ordinary use. Thus it is soluble to a certain extent in alcohol and gives on boiling an intensely-blue solution. It is also sufficiently soluble in ether, benzene, and glacial acetic acid to yield blue-colored solutions. It is slightly soluble in anilin in the cold and more soluble on boiling, and the solution is blue-green in color. It can be applied to fiber in the same ways as ordinary indigo—that is to say, it can be used in the vat or in the form of new sulfo-acids soluble in water obtained by the action of sulfuric acid on it. The shades obtained in each case are decidedly greener than those obtained with other indigo compounds now known.

In the above, caustic soda or a mixture of caustic soda and caustic potash act in the same way as does caustic potash itself.

It is the intention to cover the dyestuff generically without limitation as to whether it be unsulfonated or sulfonated.

What is claimed is—

1. As a new article of manufacture the herein-described new dyestuff which can be derived from ethyl-phenyl-glycocol, and which in its unsulfonated form when dry is a deep-blue powder giving a lustrous bronze-like streak on rubbing, like indigo it is insoluble in water but it is soluble in alcohol to a certain extent giving on boiling an intensely-blue solution, it is also sufficiently soluble in benzene, ether and glacial acetic acid to give blue-colored solutions, it is soluble in anilin in the cold and more readily on boiling and the solution is blue green; it dyes both from the vat and in the form of sulfo-acid decidedly-greenish shades of blue substantially as described.

2. The process of manufacturing a dyestuff which consists in melting ethyl-phenyl-glycocol with alkali and subsequent oxidation as by an air-blast, substantially as described.

LIVINGSTON GIFFORD,
*Administrator of the estate of Karl Heumann, deceased.*

Witnesses:
M. WILSON,
J. E. GREER.